United States Patent [19]

Pourtau et al.

[11] Patent Number: 5,203,640
[45] Date of Patent: Apr. 20, 1993

[54] PROFILED CORNER STRIP

[75] Inventors: Jean-Jacques Pourtau; Eric T. Pourtau, both of Croissy-sur-Seine, France

[73] Assignee: Tomecanic, France

[21] Appl. No.: 672,697

[22] Filed: Mar. 18, 1991

[30] Foreign Application Priority Data

Mar. 30, 1990 [FR] France .................. 90 04116

[51] Int. Cl.$^5$ .............................................. E04G 17/06
[52] U.S. Cl. ...................................... 403/403; 403/382; 403/205; 403/231; 52/254; 52/287
[58] Field of Search ............... 403/403, 382, 205, 231, 403/341; 52/34, 35, 241, 242, 254–257, 287, 288, 716, 389, 390, 391, 392

[56] References Cited

U.S. PATENT DOCUMENTS

| 3,201,908 | 8/1965 | Arnold | 52/255 |
|---|---|---|---|
| 3,206,806 | 9/1965 | Powell | 52/241 |
| 3,398,494 | 8/1968 | Larson | 52/255 |
| 4,014,618 | 3/1977 | Kristiansen | 403/403 X |
| 4,722,153 | 2/1988 | Yardy | 52/256 X |
| 5,073,430 | 12/1991 | Aidan | 52/287 X |

FOREIGN PATENT DOCUMENTS

| 3138380 | 4/1983 | Fed. Rep. of Germany . | |
| 8600241 | 3/1986 | Fed. Rep. of Germany . | |
| 8700465 | 2/1987 | Fed. Rep. of Germany . | |
| 8808171 | 12/1988 | Fed. Rep. of Germany . | |
| 2487409 | 1/1982 | France . | |
| 2576945 | 8/1986 | France . | |
| 356262 | 9/1961 | Switzerland | 52/257 |
| 571131 | 12/1975 | Switzerland | 52/288 |
| 960065 | 6/1964 | United Kingdom | 52/288 |
| 1190252 | 4/1970 | United Kingdom . | |
| 2171734 | 9/1986 | United Kingdom . | |
| 2203996 | 11/1988 | United Kingdom | 52/716 |

Primary Examiner—Andrew V. Kundrat
Assistant Examiner—Harry C. Kim
Attorney, Agent, or Firm—Marshall & Melhorn

[57] ABSTRACT

This invention relates to a profiled strip adapted to be used for making the join between two surface coverings making therebetween a determined re-entrant angle, wherein this profiled strip comprises: two bearing sole plates which are made of a hard, semi-rigid material, which are each adapted to be placed below one of the surface coverings and which each present an extension extending in a direction offset angularly by substantially 90°; and a connecting bridge which connects the extensions, which is made of a supple material and which maintains the bearing sole plates angularly offset with respect to the re-entrant angle.

One application of the invention is the production of a profiled strip for joining the tiles of two vertical walls.

11 Claims, 2 Drawing Sheets

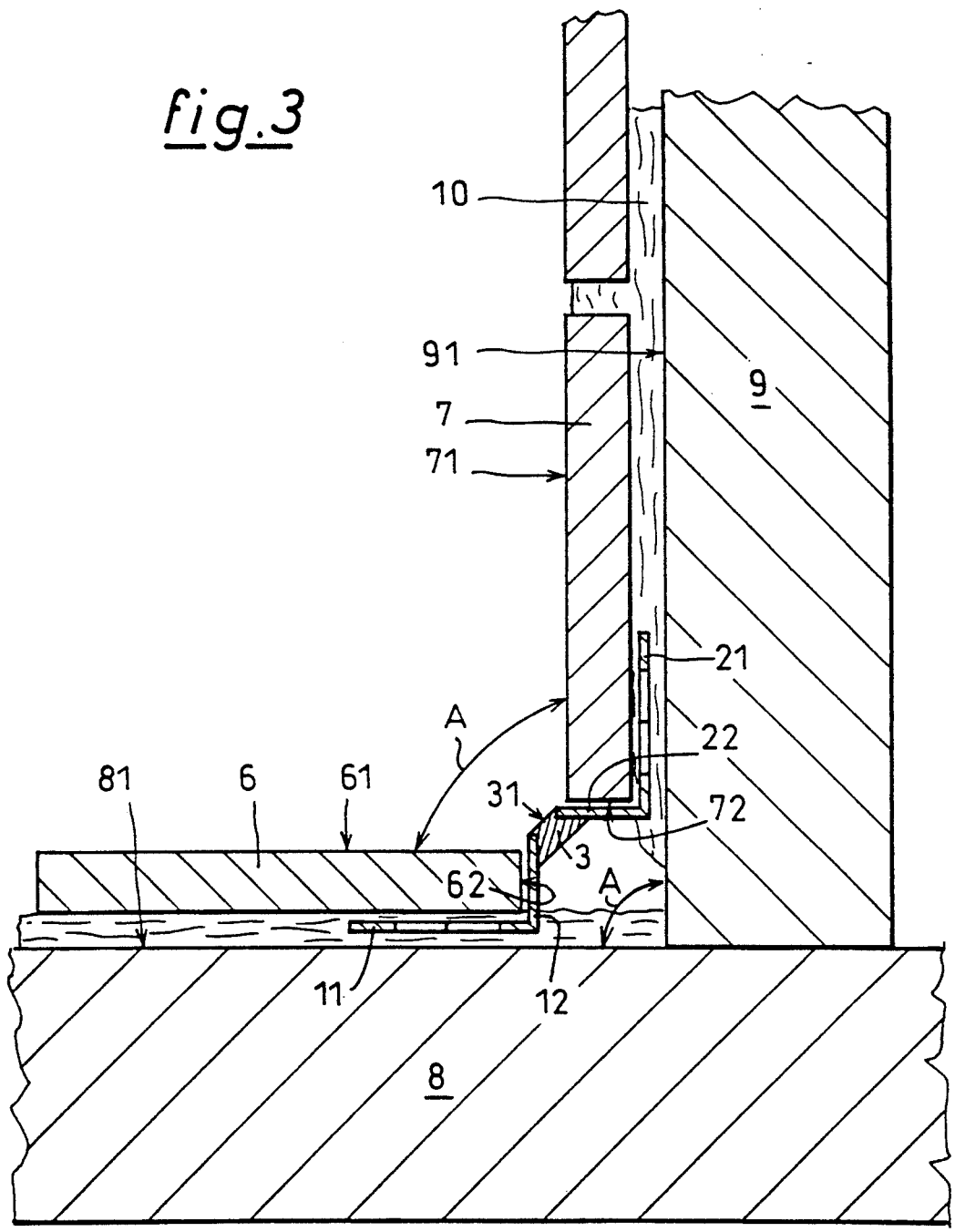

PROFILED CORNER STRIP

FIELD OF THE INVENTION

The present invention relates to a profiled strip adapted to be used for effecting the join between two surface coverings separated by a re-entrant angle and to a process for manufacturing such a profiled strip.

It concerns in particular the production of a specific profiled strip for ensuring, on the one hand, the seal of a re-entrant angle constituted by two coverings of tiles or other materials applied on walls, partitions or floors laid respectively in different planes, more commonly at 90°, and, on the other hand, ensuring join between said two coverings, so as to absorb the angular movements of shrinkages, expansions or tensions provoked both by the coverings and by the walls, partitions or floors. At the present time, the joining together of wall, partition or floor elements still presents considerable problems of connection, particularly for the coverings which cover them.

BACKGROUND OF THE INVENTION

Different solutions known at the present time can be classified in two main categories:

The first category contains the solutions based on joins made and moulded in situ, based on silicons or other elastic materials. Unfortunately, these solutions are only temporary, as the elastic material deteriorates aesthetically after a more or less short time and becomes detached from the materials with which it had to ensure a perfect join. In that case, the poor join must be removed, the surfaces cleaned and a fresh joint must be made.

The second category of solutions consists in mechanical systems of two elements generally placed at 90° and presenting particular cross-sections allowing a male element to slide in a female element.

Such systems also present considerable drawbacks, for example, they are too cumbersome and inaesthetic, they do not ensure perfect seal and are very difficult to clean.

It is precisely an object of the present invention to propose a profiled strip producing aesthetic, long-lasting and functional joins of re-entrant angles constituted by two coverings of tiles or other materials applied on walls, partitions or floors.

SUMMARY OF THE INVENTION

The invention therefore relates to a profiled strip adapted to be used for making the join between two surface coverings making therebetween a determined re-entrant angle, such as wall or floor tiles.

According to the invention, this profiled strip comprises: two bearing sole plates which are made of a hard, semi-rigid material such as hard, semi-rigid PVC, which are each adapted to be placed parallel to and below one of said surface coverings and which each present an extension extending in a direction offset angularly by substantially 90° and adapted to be placed parallel to and in the vicinity of an end edge of said covering; and a connecting bridge which connects said extensions of the two bearing sole plates, which is made of a supple material such as supple PVC and which maintains said bearing sole plates angularly offset with respect to said determined re-entrant angle.

The following advantageous arrangements are, in addition, preferably adopted:

each bearing sole plate presents perforations each shaped as two equal trapezia having their small bases merged into a common small base, these various perforations being separated by solid parts;

the profiled strip presents the following dimensions: a) the common small base of the trapezia of a perforation has a length which is greater than half the length of a large base; b) the width of a perforation, equal to the sum of the heights of the two trapezia constituting it, is included between 0.5 and 1 times the length of the large base of a trapezium; c) the distance of the solid part separating the angles of two large bases of the trapezia of two successive perforations is included between 0.4 and 0.6 times the length of the large base of a trapezium;

said trapezia are isosceles trapezia;

the outer faces of the bearing sole plates comprise parallel striae over the whole of their length and their width;

the inner faces of the solid parts of the bearing sole plates comprise parallel striae over the whole of their length and their width;

the connecting bridge has a cross-section which is symmetrical with respect to the bisectrix of the angle formed by the extensions of the two bearing sole plates and which is shaped as an isosceles trapezium, said connecting bridge being placed essentially in the re-entrant angle formed by said extensions;

the small base of the trapezium constituting the cross-section of the connecting bridge connects the end edges of the extensions of the two bearing sole plates and constitutes a visible part of said profiled strip after the join between the two surface coverings has been made;

the thickness of the connecting bridge is included between 3 and 5 times, preferably equal to 4 times, the thickness of the extension of a bearing sole plate;

the thicknesses of the bearing sole plates and those of their extension are all equal to the same value.

The invention also relates to a process for manufacturing a profiled strip as defined hereinabove, this profiled strip being made by simultaneously extruding the materials constituting each bearing sole plate and its extension and constituting the connecting bridge.

It is advantageously preferred to effect said extrusions hot.

The principal advantage of a profiled strip according to the invention is that of producing a clean, long-lasting join of two surface coverings, whilst being perfectly fixed, by its bearing sole plates, particularly thanks to the perforations and to the striae of said sole plates, to the supports of said surface coverings.

BRIEF DESCRIPTION OF THE DRAWINGS

The invention will be more readily understood on reading the following description with reference to the accompanying drawings, in which:

FIG. 3 is a section through the join of a wall and of a vertical partition covered with tiles, such join being made by the profiled strip of FIGS. 1 and 2.

DETAILED DESCRIPTION OF THE DRAWINGS

Figure 1:
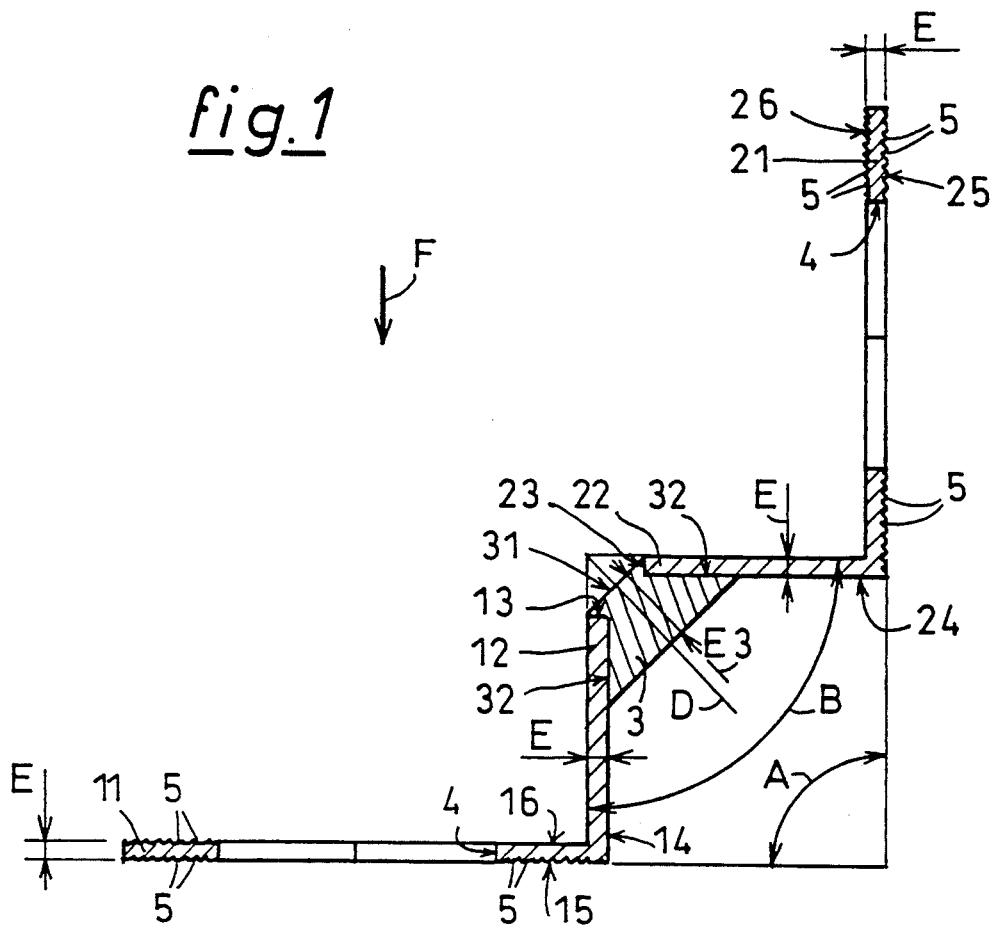
FIG. 1 is a cross-section, along I—I of FIG. 2, of a profiled strip according to the invention.
Figure 2:
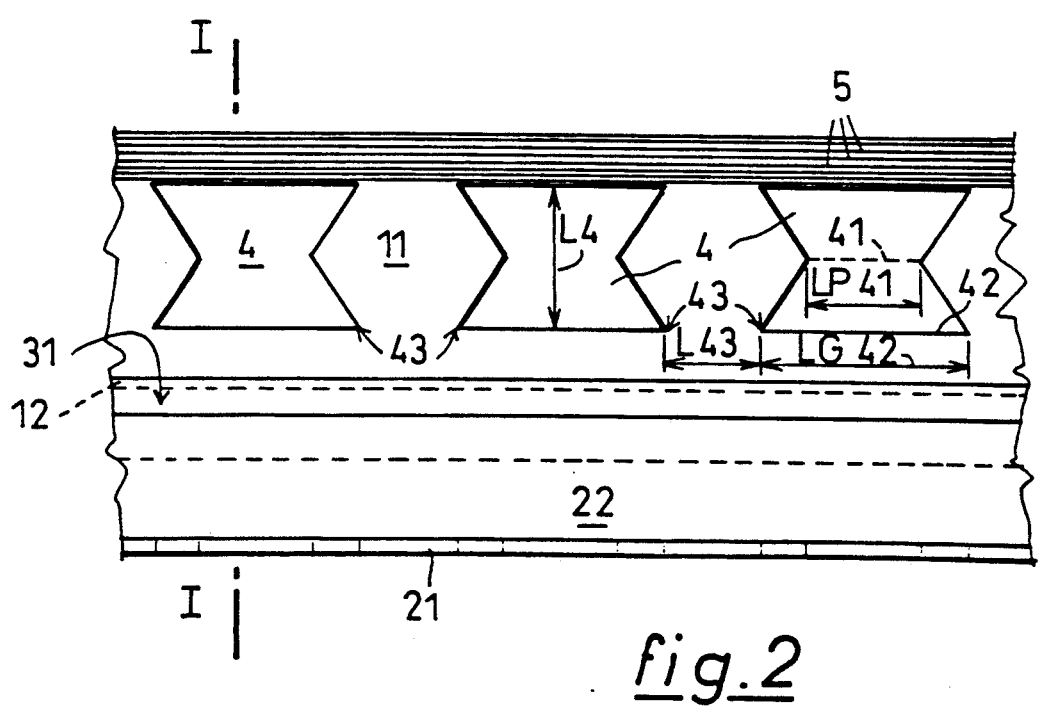
FIG. 2 is a view in the direction of arrow F of FIG. 1.

Referring now to the drawings, the profiled strip according to the invention comprises:

two bearing sole plates 11 and 21, offset angularly by a re-entrant angle A, in this case equal to 90°, and in any case equal to the re-entrant angle separating the faces 81, 91 of a wall 8 and of a partition 9, and also separating the faces 61, 71 of the tiles 6, 7 covering this wall and partition, respectively;

an extension 12, 22 of each bearing sole plate 11, 21, respectively, which is monobloc with the corresponding sole plate and offset by substantially 90° with respect to this sole plate;

a connecting bridge 3, which is shaped as an isosceles trapezium, and connects the two extensions 12 and 22, being placed symmetrically with respect to the bisectrix D of the re-entrant angle B separating the two extensions 12, 22.

The following arrangements are noted:

the bearing sole plates 11, 21 and their extensions 12, 22 are made of a hard, semi-rigid material such as a hard, semi-rigid PVC, these different elements having equal thicknesses E;

the connecting bridge 3 is made of a supple material such as a supple PVC and has a thickness E3 included between 3 and 5 times the thickness E of an extension 12, 22, in the present case equal to 4 times the thickness E;

each bearing sole plate 11, 21 and its extension 12, 22 is made by extrusion, in the embodiment described, in a hard PVC; similarly, the connecting bridge 3, made in the example described of supple PVC, is also obtained by extrusion; the extrusions of these sub-assemblies are effected simultaneously and enable the complete profiled strip to be obtained and, in the products made, were effected hot; this may also be called co-extrusion;

the small base 31 of the trapezium forming the connecting bridge 3 connects the end edges 13, 23 of the extensions 12, 22, whilst the sides 32 of this trapezium are glued to the faces 14, 24 of said extensions 12, 22 which define the re-entrant angle B;

each bearing sole plate 11, 21 presents perforations 4, having the form of two isosceles trapezia joined by their common small base 41 and having a large base 42 of which the ends constitute two angles 43 of each trapezium, these perforations 4 being separated by solid parts;

the common small base 41 of a trapezium has a length LP41 which is greater than half the length LG42 of a large base 42;

the width L4 of a perforation 4, equal to the sum of the heights of the two trapezia constituting this perforation, is included between 0.5 and 1 times the length LG42 of a large base 42;

the distance L43 of the solid part separating two angles 43, which constitute angles of two large bases of trapezia of two successive perforations, is included between 0.4 and 0.6 times the length LG42 of a large base 42;

the face 15, 25 of the bearing sole plate 11, 21, which is outside the re-entrant angle A, similarly to face 16, 26 inside this re-entrant angle A, is striated (striae 5).

This profiled strip is placed, as shown in FIG. 3, with the bearing sole plates 11, 21 placed parallel to the outer faces 61, 71 of tilings 6, 7 which cover the faces 81, 91 of a wall 8 and of a partition 9, respectively, which form therebetween the re-entrant angle A, these bearing sole plates 11, 21 being disposed below the tiles of the two tilings and embedded in the adhesive mortar 10 with which said tiles are laid.

The extensions 12, 22 are themselves disposed parallel to and opposite the end edges 62, 72 of the tilings 6, 7, respectively. In practice, only the small base 31 of the trapezium constituting the connecting bridge 3 is visible in the re-entrant angle A formed by the outer faces 61 and 71 of the tilings 6 and 7.

The shapes of the perforations 4 allow effects of wedging in the different directions, which perfectly immobilize the profiled strip in the adhesive mortar 10.

Furthermore, the supple connecting bridge 3 ensures a link between extensions 12, 22 even in the case of a relative displacement of the tiling 7 or of the partition 9 with respect to the tiling 6 or the wall 8, by reason of its very suppleness. In addition, the connecting bridge ensures seal of the join and its aesthetic appearance is not subject to deterioration.

The invention is not limited to the embodiment described, but covers, on the contrary, all the variants which may be made thereto without departing from its scope nor its spirit.

What is claimed is:

1. A profiled corner strip to be bonded by mortar to two surface coverings disposed at substantially a 90 degree angle, said profiled corner strip comprising:
    a) first mounting means for securing and positioning the profiled strip, said first mounting means including a striated sole plate, and an integral extension formed perpendicular to the sole plate and extending along a longitudinal edge of said first mounting means;
    b) second mounting means for securing and positioning the profiled strip, said second mounting means including a striated sole plate, and an integral extension formed perpendicular to the sole plate and extending along a longitudinal edge of said second mounting means;
    c) a plurality of spaced apart apertures between an inner surface and an outer surface of the sole plates of said first mounting means and said second mounting means wherein each said aperture is shaped as two trapezia, each trapezoid having a large base defined by one of two parallel longitudinal sides of said aperture and a common small base defined by a line between two inwardly angled sides connecting the longitudinal sides;
    d) a flexible bridge for sealably engaging both the extension of said first mounting means and the extension of said second mounting means, said bridge having an isoscel trapezoidal configuration in cross section, whereby said bridge forms a sealed joint between the two surface coverings when said first mounting means is bonded to the first surface covering and said second mounting means is bonded to the second surface covering.

2. A profiled corner strip for interconnecting two surface coverings disposed at substantially a 90 degree angle, said profiled corner strip comprising:
    a) first mounting means for securing and positioning the profiled strip, said first mounting means including an elongate sole plate, and an integral extension formed perpendicular to the sole plate and extending along a longitudinal edge of said first mounting means;

b) second mounting means for securing and positioning the profiled strip, said second mounting means including an elongate sole plate, and an integral extension formed perpendicular to the sole plate and extending along a longitudinal edge of said second mounting means;

c) flexible bridge means for sealably engaging both the extension of said first mounting means and the extension of said second mounting means, whereby said bridge means forms a sealed joint between the two surface coverings when said first mounting means is bonded to the first surface covering and said second mounting means is bonded to the second surface covering; and d) a plurality of spaced-apart apertures between an inner surface and an outer surface in both the sole plate for said first mounting means and the sole plate for said second mounting means, wherein each said aperture is shaped as two trapezia, each trapezoid having a large base defined by one of two parallel longitudinal sides of said aperture and a common small base defined by a line between two inwardly angled sides connecting the longitudinal sides.

3. A profiled corner strip for interconnecting two surface coverings disposed at substantially a 90 degree angle, said profiled corner strip comprising:

a) first mounting means for securing and positioning the profiled strip, said first mounting means including an elongate sole plate, and an integral extension formed perpendicular to the sole plate and extending along a longitudinal edge of said first mounting means;

b) second mounting means for securing and positioning the profiled strip, said second mounting means including an elongate sole plate, and an integral extension formed perpendicular to the sole plate and extending along a longitudinal edge of said second mounting means; and c) flexible bridge means for sealably engaging both the extension of said first mounting means and the extension of said second mounting means, said bridge means including an elongate bridge having a trapezoidal cross section configuration with a long base, a short base parallel to the long base, and two sides, the elongate bridge extending longitudinally between an outer end of the extension of said first mounting means and an outer end of the extension of said second mounting means, whereby said bridge means forms a sealed joint between the two surface coverings when said first mounting means is bonded to the first surface covering and said second mounting means is bonded to the second surface covering.

4. The profiled strip of claim 3 wherein the short base of the bridge connects an outer end of the extension of the first mounting means to an outer end of the extension of the second mounting plate whereby the short base forms a visible surface of the joint between the two surface coverings.

5. The profiled strip of claim 3 wherein a side of the bridge is affixed to a surface of the extension of the first mounting means and the other side of the bridge is affixed to a surface of the extension of the second mounting means.

6. The profiled strip of claim 3 wherein the cross section configuration is an isosceles trapezoid.

7. The profiled strip of claim 6 wherein the short base is at least fifty percent of the length of the long base.

8. The profiled strip of claim 3 wherein the bridge is made from a flexible material whereby the bridge may change form due to the shifting of the surface coverings without disengaging the extensions from said mounting means.

9. The profiled strip of claim 8 wherein the flexible material includes soft polyvinyl chloride.

10. The profiled strip of claim 3 wherein both an outer surface and an inner surface of the sole plate for said first mounting means and an outer surface and an inner surface of the sole plate for said second mounting means all include striated surfaces.

11. The profiled strip of claim 3 wherein the distance between the short base and the long base is equal to or greater than three times the thickness of the extension of said first mounting means and said second mounting means.

* * * * *